UNITED STATES PATENT OFFICE 2,361,524

β-ALKYL-SUBSTITUTED ETHYLAMINES

Hans-Georg Allardt, Philippsthal, Krs. Teltow, and Karl Junkmann, Berlin, Germany, assignors to Schering Corporation, Bloomfield, N. J., a corporation of New Jersey No Drawing. Application February 25, 1938, Serial No. 192,642. In Germany February 26, 1937

3 Claims. (Cl. 260—583)

This invention relates to a process for the manufacture of β-alkyl-substituted ethylamine derivatives and to the products obtained thereby.

The invention is based on our discovery that β-alkyl-substituted ethylamine derivatives of the following formula:

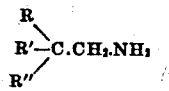

in which R, R' and R" indicate the same or different alkyl residues, or R' and/or R" can also indicate hydrogen, and which contain in the molecule at least 11 and at most 18 carbon atoms, are distinguished by strong peripheral paralytic (spasmolytic) properties.

The manufacture of these compounds takes place according to the present invention by the methods known for the manufacture of amines, i. e. by the methods hereinafter set forth or their obvious chemical equivalents.

As particularly suitable have proved processes in which nitriles of the formula:

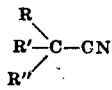

or their water-addition products, amides of the formula:

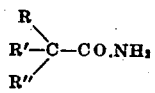

are subjected to the action of reducing agents, for example of nascent or catalytically activated hydrogen. It is also possible, however, to subject the amides of the corresponding acids, which contain in the molecule one carbon atom more than the amines to be produced, to the known degradation methods, for example those according to Hofmann or Curtius, or the like.

For the technical manufacture it has proved to be most advantageous to reduce the said nitriles or amides in the presence of non-noble metal catalysts suitably precipitated on carriers, preferably nickel catalysts precipitated on kieselguhr, with hydrogen under super-atmospheric pressure at elevated temperature, for example at 120–140° C. By employing so-called Raney-catalysts, as can be obtained for example according to the process of U. S. Patent No. 1,915,473, the reduction can also be carried out at lower temperature, for example at 70° C.

To establish the spasmolytic activity of the individual amines standardisation is effected by means of a still functioning rabbit intestine maintained permanently in Tyrode's solution containing barium. The individual preparations were always standardised against novocaine hydrochloride as comparison preparation. In these experiments novocaine hydrochloride was equal to 1/75 papaverine hydrochloride. From the following table it is seen that β-alkyl-substituted ethyamines, the number of carbon atoms of which is low, possess only a moderate peripheral paralytic effect. The activity rises however in an astonishing manner quite considerably when the molecule of the substances contains at least 11 carbon atoms and, in fact, such an increase takes place that the amines become equal in effect to papaverine or even excel it. The activity, however, falls when the carbon atom content rises above 18.

| Ethylamine examined | C-No. | Activity No. (novocainhydrochloride 1) |
|---|---|---|
| βββ-Triethyl-ethylamine hydrochloride | 8 | 7.5 |
| βββ-Tripropylethylamine hydrochloride | 11 | 50 |
| (β) n-tetradecamine hydrochloride | 14 | 75 |
| β-ββ-Diethyl - n - hexylethylamine hydrochloride | 12 | 120 |
| ββ-Di-n-hexylethylamine hydrochloride | 14 | 150 |
| βββ-Ethyl-di-n-butylethylamine hydrochloride | 12 | 200 |
| βββ-Ethyldiisoamylethylamine hydrochloride | 14 | 200 |
| βββ-Tri-n-butylethylamine hydrochloride | 14 | 450 |
| βββ-Tri-isoamylethylamine hydrochloride | 17 | 300 |
| βββ-Tri-n-hexylethylamine hydrochloride | 20 | (¹) |

¹ Practically inactive.

It is seen from the table that by the manufacture of the hitherto unknown β-ethylamine derivatives a new group of therapeutically important substances with strong spasmolytic properties has been discovered.

The following examples illustrate the invention, the parts being by weight:

Example 1

200 grams of tri-n-butylacetonitrile (B. P. 128° C. under 4.6 mm.) with the addition of 20 parts of nickel catalyst on kieselguhr, which has been reduced for 1 hour at about 450° C. in a stream of hydrogen, are heated in an autoclave under 20–100 atmospheres hydrogen pressure to 130° C. until the taking up of hydrogen ceases. 44 litres of hydrogen are taken up. After separation of the catalyst the contents of the autoclave are fractionally distilled.

The distillation yields about 95% of the theoretical quantity of pure β-tri-n-butylethylamine of B. P. 140–142° C. under 13 mm.

By neutralisation of the base with the calculated quantity of hydrochloric acid and evaporation, there is obtained therefrom the hydrochloride in the form of leaflets of M. P. 135–136° C. (from water).

*Example 2*

200 parts of tri-n-butylacetamide (M. P. 61–62° C.; B. P. 183–186° C. under 12 mm.) are heated under hydrogen pressure to 120–150° C. in an autoclave with the addition of 25 parts of nickel catalyst obtained from precipitated basic nickel carbonate which has been reduced 1 hour at 450° C. The water produced in the reaction is blown off a few times in the course of the hydrogenation after cooling to 110° C. After completion of the taking up of hydrogen working up is carried out as described in Example 1. There is likewise obtained the β-tri-n-butylethylamine there described.

*Example 3*

60 parts of ethyl-di-isoamylacetonitrile (B. P. 129–132° C. under 12 mm.) (obtained according to German Patent No. 570,594 from butyronitrile, sodamide, and isoamyl bromide) are dissolved in alcohol. Thereupon metallic sodium is gradually introduced into the boiling alcoholic solution. After distilling off with steam, the amine, obtained by the customary methods from the steam distillate, is subjected to fractional distillation. The β-ethyl-β-diisoamylethylamine has the B. P. 126–128° C. under 12 mm. Its hydrochloride crystallises from dilute hydrochloric acid and has the M. P. 94–96° C. It is easily soluble in benzine and slightly soluble in water. The amine is obtained in better yields than by the above described process, when ethyl-di-isoamyl-acetonitrile is reduced according to the process of Example 1 or when the ethyl-di-isoamyl-acetamide of B. P. 178° C. under 12 mm. and M. P. 50° C., easily obtainable from the nitrile by adding on water by means of 70% sulphuric acid at 150°, is subjected to reduction according to Example 2.

In a corresponding manner other high molecular amines can also be obtained.

*Example 4*

76 parts of di-n-hexylacetonitrile (B. P. 164–167° C. under 22 mm.) are treated in a shaking vessel with the addition of 3 parts of Raney catalyst at 70° C. under a pressure of about 30 cms. of water with pure hydrogen so long as hydrogen is taken up (about 16.5 litres in all). The reaction product is then separated from catalyst and fractionally distilled. The β-di-n-hexylethylamine obtained exhibits the B. P. 146–148° C. under 15 mm. Its picrate melts at 162° C. (leaflets from methanol). The hydrochloride has the M. P. 124–125° C., it dissolves easily in petrol ether, ether, benzene, carbon tetrachloride and slightly in cold water; the hot aqueous solutions set on cooling to a jelly.

The di-n-hexylacetonitrile serving as starting material is produced in known manner by converting cyanacetic acid ethyl ester by reaction with sodium alcoholate and hexyl bromide into di-n-hexylcyanacetic acid methyl ester of B. P. 174–178° C. under 10.5 mm. By saponification with alcoholic caustic soda lye at room temperature there is obtained therefrom the sodium salt of the di-n-hexylcyanacetic acid. The free acid splits off carbon dioxide at 350° C. and gives in over 30% yield the di-n-hexylacetonitrile.

Where in the claims we speak of the β-alkyl-substituted ethyl amines, their salts, such as the hydrochlorides, are to be understood as equivalents.

Having now particularly described and ascertained the nature of our said invention and in what manner the same is to be performed, we declare that what we claim is:

1. A spasmolytic agent for producing peripheral paralysis in the animal organism, comprising β-tri-n-butylethylamine compound of the general formula C₁₄H₃₁N and the structural formula

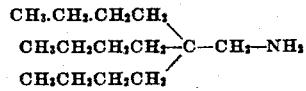

having a B. P. 140–142° C. under 13 mm.

2. A spasmolytic preparation for producing peripheral paralysis in the animal organism, comprising β-tri-isoamyl ethyl amine.

3. A spasmolytic agent for producing peripheral paralysis in the animal organism, comprising a β-alkyl-substituted ethylamine derivative of the following general formula

wherein R, R', and R'' represent the same alkyl residue, said derivative having at least 11 and, at the most, 18 carbon atoms.

KARL JUNKMANN.
HANS-GEORG ALLARDT.